United States Patent
Tsien et al.

(10) Patent No.: US 9,870,473 B2
(45) Date of Patent: Jan. 16, 2018

(54) SYSTEM AND METHOD FOR SECURITY PROCESSOR CONTROL OVER CPU POWER STATES

(71) Applicant: Advanced Micro Devices, Inc., Sunnyvale, CA (US)

(72) Inventors: Benjamin Tsien, Fremont, CA (US); Denis Rystsov, San Francisco, CA (US); Sebastien Nussbaum, Lexington, MA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 14/529,278

(22) Filed: Oct. 31, 2014

(65) Prior Publication Data
US 2015/0121520 A1 Apr. 30, 2015

Related U.S. Application Data

(60) Provisional application No. 61/898,240, filed on Oct. 31, 2013.

(51) Int. Cl.
| | |
|---|---|
| H04L 29/06 | (2006.01) |
| G06F 21/57 | (2013.01) |
| G06F 21/50 | (2013.01) |
| G06F 1/26 | (2006.01) |
| G06F 21/81 | (2013.01) |
| G06F 1/32 | (2006.01) |

(52) U.S. Cl.
CPC ............... *G06F 21/57* (2013.01); *G06F 1/26* (2013.01); *G06F 1/3206* (2013.01); *G06F 1/3237* (2013.01); *G06F 1/3287* (2013.01); *G06F 21/50* (2013.01); *G06F 21/81* (2013.01); *Y02B 60/1221* (2013.01); *Y02B 60/1282* (2013.01)

(58) Field of Classification Search
CPC ........................................................ G06F 21/57
See application file for complete search history.

(56) References Cited

U.S. PATENT DOCUMENTS

| | | | | |
|---|---|---|---|---|
| 7,873,847 | B2 * | 1/2011 | Bozek ................... | G06F 1/3209 709/203 |
| 2002/0132603 | A1 * | 9/2002 | Lindskog .......... | H04W 52/0232 455/343.4 |

(Continued)

*Primary Examiner* — Shawnchoy Rahman
(74) *Attorney, Agent, or Firm* — Faegre Baker Daniels LLP

(57) ABSTRACT

The present disclosure presents methods and apparatuses for controlling a power state, which may include a C-state, of one or more processing cores of a processor. In an aspect, an example method of securing a power state change of a processor is presented, the method including the steps of receiving a power state change request from the processor, the processor having a plurality of potential power states each including an operating power profile; determining a power state change request mode associated with the processor; forwarding the power state change request to a security processor where the power state change request mode is a one-time request mode; receiving a power state change request response from the security processor in response to the request; and adjusting the current power state of the processor to the target power state where the power state change request response comprises a power state change approval.

30 Claims, 4 Drawing Sheets

(56) References Cited

U.S. PATENT DOCUMENTS

| | | | | |
|---|---|---|---|---|
| 2004/0003299 A1* | 1/2004 | Malueg | ................. | G06F 1/3203 |
| | | | | 713/300 |
| 2008/0162956 A1* | 7/2008 | Bozek | ................... | G06F 1/3209 |
| | | | | 713/310 |
| 2008/0162958 A1* | 7/2008 | Bozek | ................... | G06F 1/3209 |
| | | | | 713/310 |
| 2009/0217065 A1* | 8/2009 | Araujo, Jr. | ............ | G06F 1/3203 |
| | | | | 713/320 |
| 2012/0151227 A1* | 6/2012 | Gaskins | ................ | G06F 1/3237 |
| | | | | 713/300 |
| 2013/0132745 A1* | 5/2013 | Schoening | ............ | G06F 1/3209 |
| | | | | 713/310 |

\* cited by examiner

SYSTEM AND METHOD FOR SECURITY PROCESSOR CONTROL OVER CPU POWER STATES

RELATED APPLICATIONS

This application claims priority to Provisional Application Ser. No. 61/898,240, filed on Oct. 31, 2013, having inventors Benjamin Tsien et al., titled "SYSTEM AND METHOD FOR SECURITY PROCESSOR CONTROL OVER CPU POWER STATES", and is incorporated herein by reference.

FIELD OF THE DISCLOSURE

The present disclosure is generally related to processor security, and more particularly to methods and systems for monitoring and controlling a power state change of at least one processor.

BACKGROUND

A processing node or core in a computing system may be placed in any of multiple power states, also referred to as C-states, during operation, where the particular power state is characterized by associated clock and/or power gating. During transitions from one power state to another, secret data (e.g. central processing unit (CPU) cache information that may contain core architectural state information) may be susceptible to attack by one or more unauthorized third parties. Typically, the decision to transition the processing node between power states is made by the trusted operating system (OS) and/or associated microcode. In some instances, every state resume or request to enter an idle power state originating from the operating system is treated as trusted and therefore initiates a corresponding power state change.

With such legacy computing systems, if an unauthorized third party obtains administrator rights to the microcode or operating system, it follows that each may be susceptible to unauthorized manipulation that may hamper the performance of the processing node. For example, because entry and exit from a power state takes significant time to complete, if a third party is able to request a high number of power state changes in a relatively short time period, the performance of the processing node subject to the power state changes may become significantly degraded. Furthermore, secret information may be transferred to off-processor memory when certain power state changes occur. Thus, if an untrusted third party were able to manipulate the operating system or microcode to strategically initiate power state change requests, the third party may be able to predictably recover the secret data.

Therefore, a need exists for methods and systems to provide improved monitoring and secure control during a power state change of the processor to thereby reduce the likelihood of a security breach.

BRIEF DESCRIPTION OF THE DRAWINGS

The embodiments will be more readily understood in view of the following description when accompanied by the below figures and wherein like reference numerals represent like elements.

DETAILED DESCRIPTION

Figure 1:
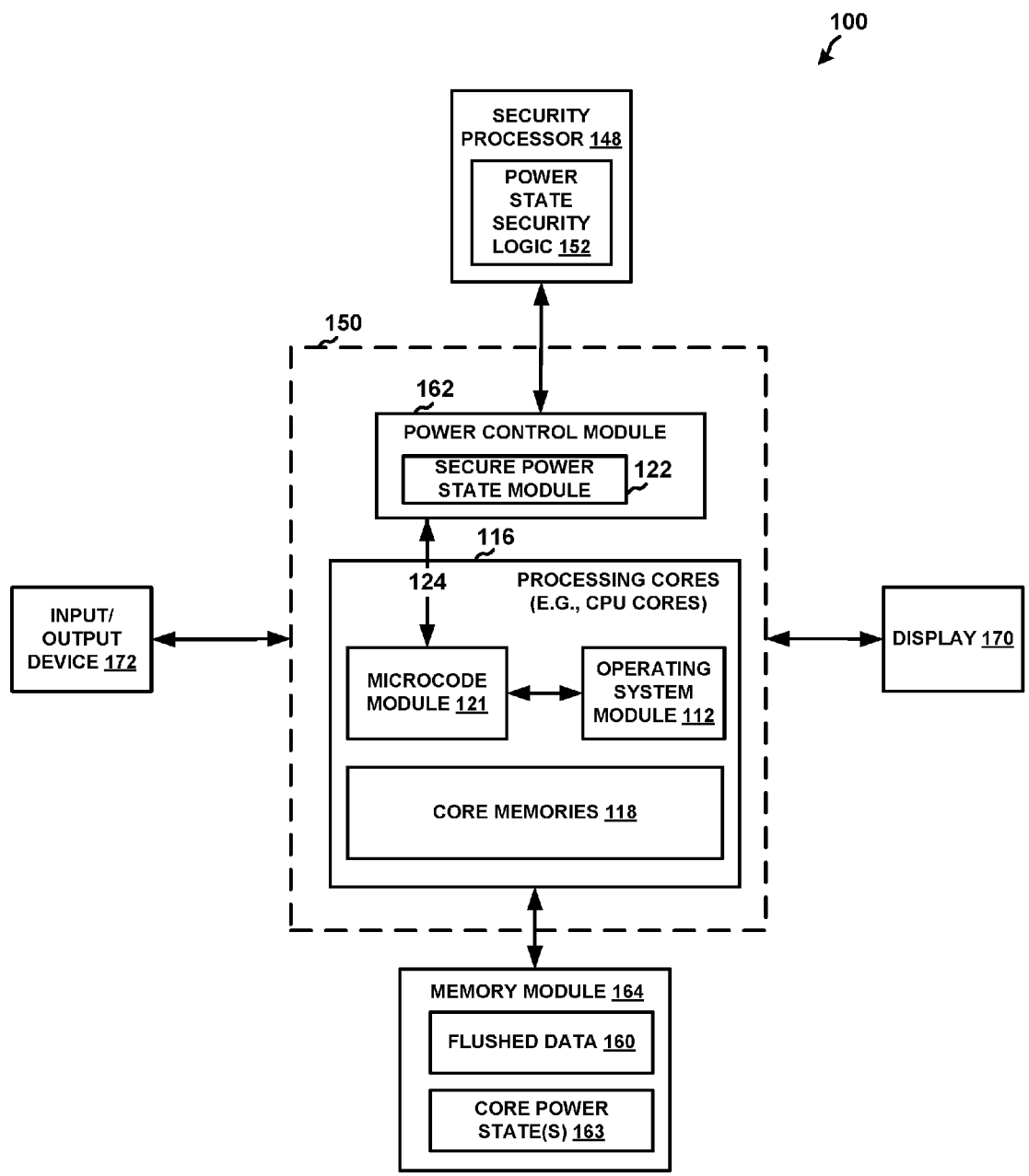
FIG. 1 is a block diagram of a computing system in accordance with some embodiments including a security processor in communication with a power control module.

The terms "component," "components," "module" and "modules" are understood to encompass a tangible entity, be that an entity that is physically constructed, specifically configured (e.g. hardwired), or temporarily (e.g. transitorily) configured (e.g. programmed) to operate in a specified manner or to perform part or all of any operation described herein. Considering examples in which modules are temporarily configured, one instantiation of a module may not exist simultaneously with another instantiation of the same or different module. For example, when the modules comprise a general-purpose hardware processor configured using software, the general-purpose hardware processor may be configured as respective different modules at different times. Accordingly, software may configure a hardware processor, for example, to constitute a particular module at one instance of time and to constitute a different module at a different instance of time.

Examples, as described herein, may include, or may operate on, logic or a number of modules, modules, or mechanisms. Modules are tangible entities capable of performing specified operations and may be configured or arranged in a certain manner. In an example, circuits may be arranged (e.g. internally or with respect to external entities such as other circuits) in a specified manner as a module. In an example, the whole or part of one or more computer systems (e.g. a standalone, client or server computer system) or one or more hardware processors may be configured by firmware or software (e.g. instructions, an application portion, or an application) as a module that operates to perform specified operations. In an example, the software may reside (1) on a non-transitory machine-readable medium or (2) in a transmission signal. In an example, the software, when executed by the underlying hardware of the module, causes the hardware to perform the specified operations.

In addition, the term "logic" or "control logic" as used herein may include software and/or firmware executing on one or more programmable processors, application-specific integrated circuits (ASICs), field-programmable gate arrays (FPGAs), digital signal processors (DSPs), hardwired logic, or combinations thereof. Therefore, in accordance with the embodiments, various logic may be implemented in any appropriate fashion and would remain in accordance with the embodiments herein disclosed.

The terminology "circuit" and "circuitry" refers generally to hardwired logic that may be implemented using various discrete components such as, but not limited to, diodes, bipolar junction transistors (BJTs), field effect transistors (FETs), etc., which may be implemented on an integrated circuit using any of various technologies as appropriate, such as, but not limited to CMOS, NMOS, etc.

The present disclosure presents methods, systems, and apparatuses for a processor and/or one or more processing cores to securely transition between power states, or "C-states." In some exemplary embodiments, a power control module associated with the processor may include a secure power state module configured to receive one or more power state change requests and, depending on a power state change request mode associated with the processor or core, forward the one or more power state change requests to a security processor for evaluation and approval. In other non-limiting examples, the secure power state module may be native to the security processor, which may comprise a platform security processor (PSP).

FIG. 1 illustrates an exemplary computing system 100 according to various embodiments that is configured to provide improved security over power state (C-state) changes of a processor 150. As described herein, computing system 100 is operative to provide multiple power state change modes for improving processor security. Computing system 100 may include a processor 150, which may be configured to output one or more graphics signals to a display 170. Display 170 may be configured to receive and/or process the one or more graphics signals to display an image or images (e.g. video, video game images). Display 170 may include, for example, a monitor, television, electronic display, or any device or component configured to display one or more images based on received graphics signals. Furthermore, computing system 100 may include one or more input/output devices 172, which may be configured to provide input and/or receive output signals to and/or from processor 150. In an aspect, input/output device may include a game controller, mouse, keyboard, joystick, touch pad, or any other device capable of providing input to processor 150 or receive output therefrom.

Processor 150 includes one or more processing cores (nodes) 116, containing microcode module 121, operating system module 112, and core memories 118, and power control module 162 containing a secure power state module 122. In one embodiment, processing cores 116 execute microcode stored in microcode module 121 and operating system code stored in operating system module 112. In particular, an operating system module 112 includes operating system code executed by at least one processing core 116, and microcode module 121 includes microcode 121 also executed by at least one processing core 116. Processor 150 may include a central processing unit (CPU), a graphics processing unit (GPU), an accelerated processing unit (APU), and/or any other suitable processor or processing device. Processor 150 may be a single chip device, such as a system on a chip (SOC), or multiple physical devices, and may include one or more cores, each of which or a group of which may comprise a processor according to the present disclosure. An exemplary computing system 10 includes a gaming console, laptop, desktop, gaming system, mobile device (e.g., tablet, smartphone, etc.), multimedia player, electronic book (e-books), or any other suitable computing system or device. Furthermore, as used herein, the term "processor" may refer to a single processing core or a group of processing cores.

Microcode module 121 interfaces with operating system module 112 to control aspects of processing cores 116. Microcode module 121 receives instructions or sequences from operating system module 112 and outputs instructions/sequences the processing cores 116 for execution. In an aspect, microcode module 121 provides signals to power control module 162 for controlling the C-state of processing cores 116 based on instructions from operating system module 112.

Operating system module 112 may determine that a C-state of one or more of processing cores 116 should change from one level to another based, for example, on usage or utilization of one or more of the cores 16. Operating system module 112 signals to microcode module 121 that a particular processing core 116 should enter a new C-state. Alternatively, operating system module 112 may write an indication that a C-state should be changed to a register, and microcode module 121 may retrieve the OS indication from the register. Based on this indication, the microcode module 121 may generate a power state change request 124 and transmit the request 124 to power control module 162. The power state change request 124 identifies a target power state, which may include an on/off state of a power and/or clock source (or target operating power and a target operating frequency) of one or more of the cores 116.

If computing system 100 is hacked or otherwise accessed without authorization, the hacker may attempt to cause processor 150 (or subsystems of processor 150) to enter into an improper C-state with improper clock and/or power gating of processing cores 116. Such improper clock and/or power gating may create security vulnerabilities in computing system 100. For example, changes to the clock or power applied to the processing cores 116 may be applied to other voltage planes, pins, or rails coupled to other subsystems of processor 150, including processor core memories 118, for example. As such, if a change to the clock or power gating state occurs, or if one or more cores is placed into an idle mode of low-power C-state in an undesired manner, there may be a potential that either the processing cores 116 or other subsystems are put in a state that allows the readout of data from registers and memory locations. For example, a hacker may attempt to glitch (e.g., short-term fault) the C-state in a predictable way to cause the processor 150 to incorrectly flush data from core memories 118 to a disparate memory module 164 (e.g. DRAM), read out proprietary information from memory module 164, or perform other illegal or improper operations.

To validate one or more power state (e.g. C-state) change requests 124, computing system 100 further includes a security processor 148, which may include power state security logic 152. In some examples, security processor 148 may alternatively be a component of processor 150. In an aspect, power state security logic 152 may be configured to determine whether a particular power state change request associated with one or more processing cores 116 should be approved (e.g. is legitimate) or should be denied or ignored (e.g. is suspicious or has an unverified source). In addition, computing system 100 may include a memory module 164, which may be configured to store flushed data 160 that has been relocated from one or more core memories 118 of one or more processing cores 116 due to a power state change. Furthermore, memory module 164 may store one or more core power states 163 associated with one or more processing cores 116 of processor 150. In some examples, memory module 164 may alternatively be located as a component of processor 150.

Various other arrangements of internal and external components and corresponding connectivity of computing system 100, that are alternatives to what is illustrated in the figures, may be utilized and such arrangements of internal and external components and corresponding connectivity would remain in accordance with the embodiments herein disclosed.

In one embodiment, some or all components of processor 150 are provided as an integrated circuit on a single chip device. For example, processor 150 may include a system on a chip (SOC). In one embodiment, processing cores 116, microcode module 121, memory module 164, security processor 148, and power control module 162 are provided on a single chip device. In the illustrated embodiment, operating system code and/or microcode of operating system module 112 and microcode module 121 is physically separate from and in communication with processor 150, although such code may alternatively be included with processor 150 as shown in FIG. 1. In one embodiment, processor 150 may include an off-chip voltage, power, and/or clock regulator, and/or logic configured to gate the power and/or clock, although both regulators may be provided on-chip. Alternatively, one or more components of processor 150 may be provided on separate physical devices or chips and interfaced with on-chip components via communication paths. In one embodiment, a display, which is operative to display data processed at least in part by processing core(s) 116, is externally connected to and in communication with processor 150. In one embodiment, processor 150 includes a central processing unit (CPU), a graphical processing unit (GPU), and/or an accelerated processing unit (APU). Processing cores 116 may be used for any suitable processing tasks, such as general-purpose computations and/or graphical computations (e.g., pixel output for display on a display), for example. In one embodiment, processing cores 116 are CPU processing cores operative to provide overarching control and command of computing system 100. Other suitable configurations of computing system 100 may be provided.

Core memories 118 and memory module 164 are illustratively physically separate but may alternatively include portions of the same physical memory. Exemplary memories 118, and/or 164 include read-only memory (ROM), random access memory (RAM), hard disk storage, flash memory, or other suitable on-chip or off-chip memory types, accessible by processing cores 116. Operating system module 112 includes operating system code (e.g., software and/or firmware) executed by at least one processing core 116 for managing operation of computing system 100. Operating system module 112 is operative, for example, to manage task allocation, memory/processor usage, and hardware resources of computing system 100 and to manage the execution of one or more applications or programs stored in memory of computing system 100. Microcode module 121, which interfaces with operating system module 112 to control at least some functionality of processing cores 116, includes microcode executed by at least one processing core 116.

An exemplary operating system module 112 includes Microsoft Windows, Mac OS, Linux, or other suitable operating systems for managing the overall operation of computing system 100. Operating system module 112 and/or microcode module 121 is operative to initiate a power state change request 124 for changing a power state of one or more subsystems of processor 150, such as processing cores 116, for example. Other suitable control software and/or hardware may initiate the request 124 for the power state change. While the power state change request 124 is described herein as being used to change the power state of one or more processing cores 116, the power state change request 124 may be used to change the power state of other suitable subsystems of processor 150. In the illustrated embodiment, microcode module 121 transmits the request 124 to power control module 162, which may be configured in some embodiments to further forward the request 124 to security processor 148 for approval, as described herein.

Security processor 148 may include any suitable processing device(s), such as a general-purpose processor or other suitable processor, for managing processor security. Security processor 148 includes power state security logic 152 operative to perform power state security and monitoring functions described herein. For example, power state security logic 152 is operative to monitor and provide security controls for the power state change of processor 150. Power state security logic 152 includes software and/or firmware stored in memory executed by security processor 148. Security processor 148 may provide other suitable security related functions for processor 150 and monitor other parameters of computing system 100.

In the illustrative embodiment of FIG. 1, the power state change request 124 is routed from microcode module 121 to power state security logic 152, and power state security logic 152 manages and monitors the implementation of the request 124. Power state security logic 152 is operative to retrieve the power state change requests 124 from power control module 162 and authenticate the one or more power state change requests 124. For example, in some aspects, power state change request 124 may include one or more authentication parameters which may be, for example, appended to the requests 124 via a header. In an aspect, power state security logic 152 may compare the authentication parameters to a list of known authentication parameters to determine whether a particular power state change request 124 is authentic. In an additional or alternative aspect, authentication parameters may include one or more keys or codes to assist in authenticating the request.

In one embodiment, power state control logic 124 accesses the received request 124 triggers a power state change based on the request 124. In one embodiment, the request 124 includes separate clock and power gating requests, as described herein. Power control module 162 issues a clock and/or power gating request to clock and/or power regulators that specifies the whether an operating power and/or clock should be applied to a processing core 116 based on the power state identified in the request 124. This may include a request to "gate" (e.g. to turn on or off) a power or clock source.

In some examples, power control module 162 may include a processor or any device or component capable of processing instructions stored on a computer-readable medium (which may be an additional component of power control module 162) to control power and/or clock regulators for supplying power and clock signals to processing cores 116 based on one or more power states. Power control module 162 may additionally or alternatively comprise hardware (e.g. gates, circuitry, and/or logic), including clock and/or power regulators, which may comprise switches, configured to implement power control of the one or more processing cores based on one or more power states. The clock and/or power regulators may execute the clock and/or power gating request by sending respective signals to the respective power rail and clock rail of processing cores 116. Voltage regulator receives power from any suitable power source coupled to processor 150, such as battery power or building power, for example. In one embodiment, the clock regulator is a digital frequency synthesizer for generating an operating frequency of processing cores 116. Furthermore, the clock and/or power regulators may comprise one or more switches, which may include transistor switching devices and/or logic, which may cut off or otherwise regulate a clock and/or power applied to the one or more processing cores 116.

Processor 150 includes a plurality of predefined power states (e.g. C-states) each including the existence of applied power and/or clock signal, or a specified operating power and an operating clock frequency, at which processing cores 116 are configured to operate when in each or the plurality of predefined power states. For example, processor 150 may have eight power states (or any other suitable number) each having a predefined power and a predefined clock application state. In some predefined power states, all power and all clock signals may be cut off or fully applied based on a gating procedure controlled by the clock and/or power regulators, which may be located in power control module 162. For example, such predefined power states may include one or more C-states, such as those defined in the Advanced Configuration and Power Interface (ACPI) standard for device configuration and power management. These power states may include one or more operating states, idle states, sleep states, or the like—each of which may have an associated power and/or clock level or on/off state. Power states, including C-states, include clocking and power gating settings, an initial state and a final state for each state transition. For example, a C-state transition may include a shallow initial state and a deeper final state, or vice versa. In some examples, entering or exiting one or more of the power states may prompt the processor 150 and/or one or its processing cores 116 to flush data from one or more core memories 118 internal to processing cores 116 to memory module 164 located outside of processing core 116.

Furthermore, secure power state module 122 and/or security processor 148 may be configured to handle power state change requests 124 according to a plurality (e.g. three) of different power state change request modes. One such mode is a one-time request mode, wherein the power control module 162 may be configured to first block (e.g. refuse to implement immediately) the implementation of the target power state upon receipt of the power state change request 124, forward the power state change request 124 to security processor 148 for authentication evaluation, and execute the power state change request 124 where an approval is received from security processor 148. Alternatively, the request 124 remains blocked where the security processor 148 deems the request untrustworthy and issues a power state change request denial. A second mode is a good-until-cancel or allow-all mode, wherein the power control module may implement the target power state upon receiving any power state change request 124 associated with one or more cores in this second mode until a cancel signal is received from the security processor 148. A third potential mode is a disable mode, wherein the power state security logic 152 is disabled, which may be utilized in situations that do not require high security levels and will allow the system to operate more quickly in power saving C-states. For example, disable mode may disable an upgrade to a deep state to force the processor to reside in a shadow, quick exit state.

Figure 2:
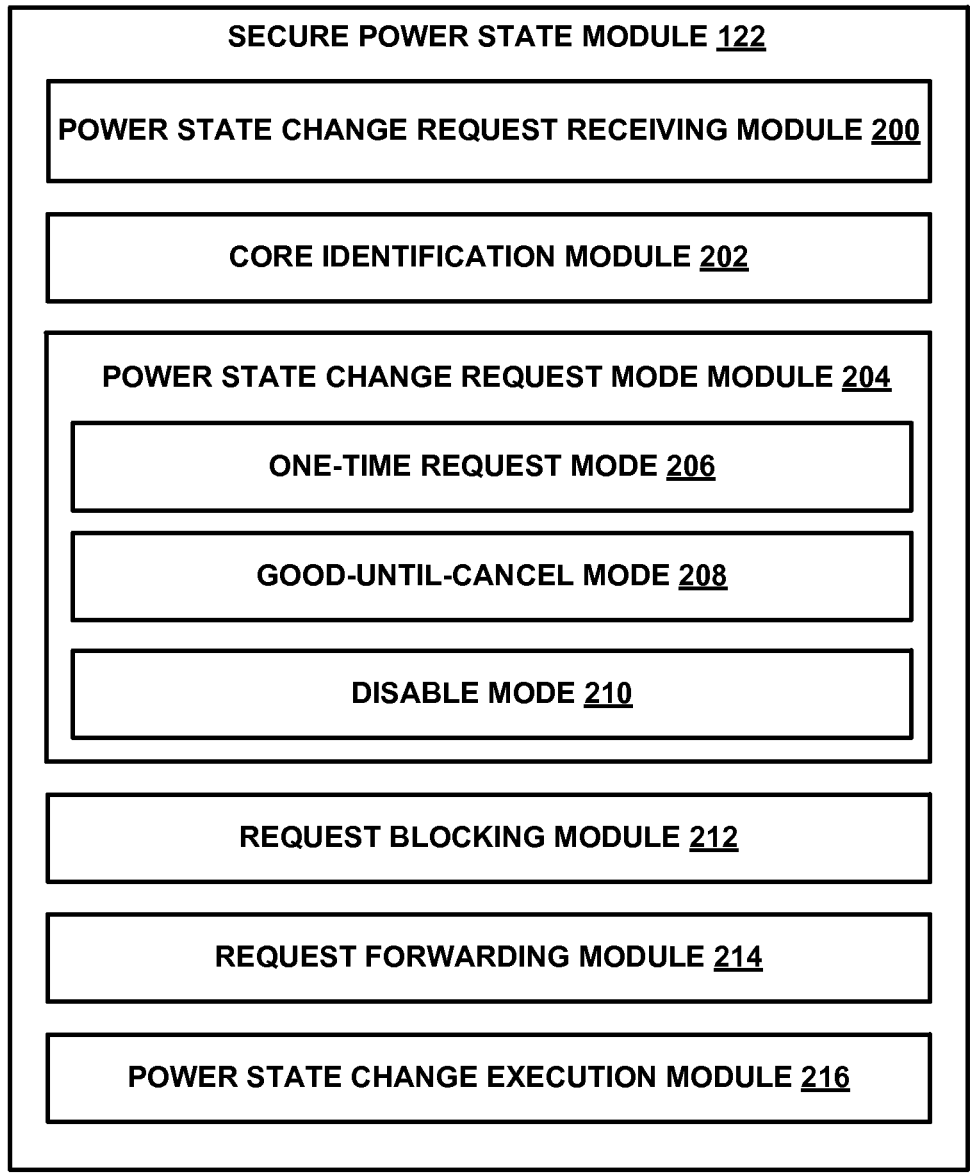
FIG. 2 is a block diagram of an exemplary secure power state module of a power control module according to some embodiments.

FIG. 2 presents a block diagram of secure power state module 122 of FIG. 1, which may be configured to receive and evaluate one or more power state change requests based upon a power state change request mode associated with the power state change request. In some examples, secure power state module 122 may be located, as in FIG. 1, in power control module 162, but may be located internal to security processor 148 as dedicated hardware and/or executable instructions (e.g. software).

Secure power state module 122 may include one or more components that may work together or separately to perform one or more functions described herein. For example, secure power state module 122 may include a power state change request receiving module 200, which may be configured to receive one or more power state change requests. In an aspect, each power state change request may include one or more core identifiers, which core identification module 202 may receive and process to identify the core to which the power state change request corresponds. Furthermore, secure power state module 122 may include a power state change request mode module 204, which may store characteristics associated with each of a plurality of power state change request modes. For example, in some embodiments, power state change request mode module 204 may store characteristics associated with a one-time request mode 206, a good-until-cancel mode 208, and/or a disable mode 210, as described above in reference to FIG. 1.

Additionally, secure power state module 122 may include a request blocking module 212, which may be configured to block one or more power state change requests received by power state change request receiving module 200. For example, where a core associated with a received power state change request is in a one-time request mode 206, request blocking module 212 may be configured to temporarily block the request until an approval is obtained. Furthermore, request blocking module 212 may be configured to fully block a power state change request where a power state change request is denied, for example, by a security processor 148. Such a denial may come in the form of a timeout for response, such as an approval not being received after a predetermined amount of time for response. Moreover, secure power state module 122 may include a request forwarding module 214, which may be configured to forward one or more power state change requests to a security processor and/or a component therein. Furthermore, secure power state module 122 may include a power state change execution module 216, which may be configured to alter a current power state (e.g. C-state) associated with one or more processors and/or processing cores to a target power state. In an aspect, such an execution may be based on receiving an approval for a particular power state change request when the processor or core(s) of the particular request is in a one-time request mode 206. Alternatively or additionally, power state change execution module may be configured to alter the current power state to the target power state when the processor or core(s) of the particular request are in a good-until-cancel 208 or disable mode 210.

Figure 3:
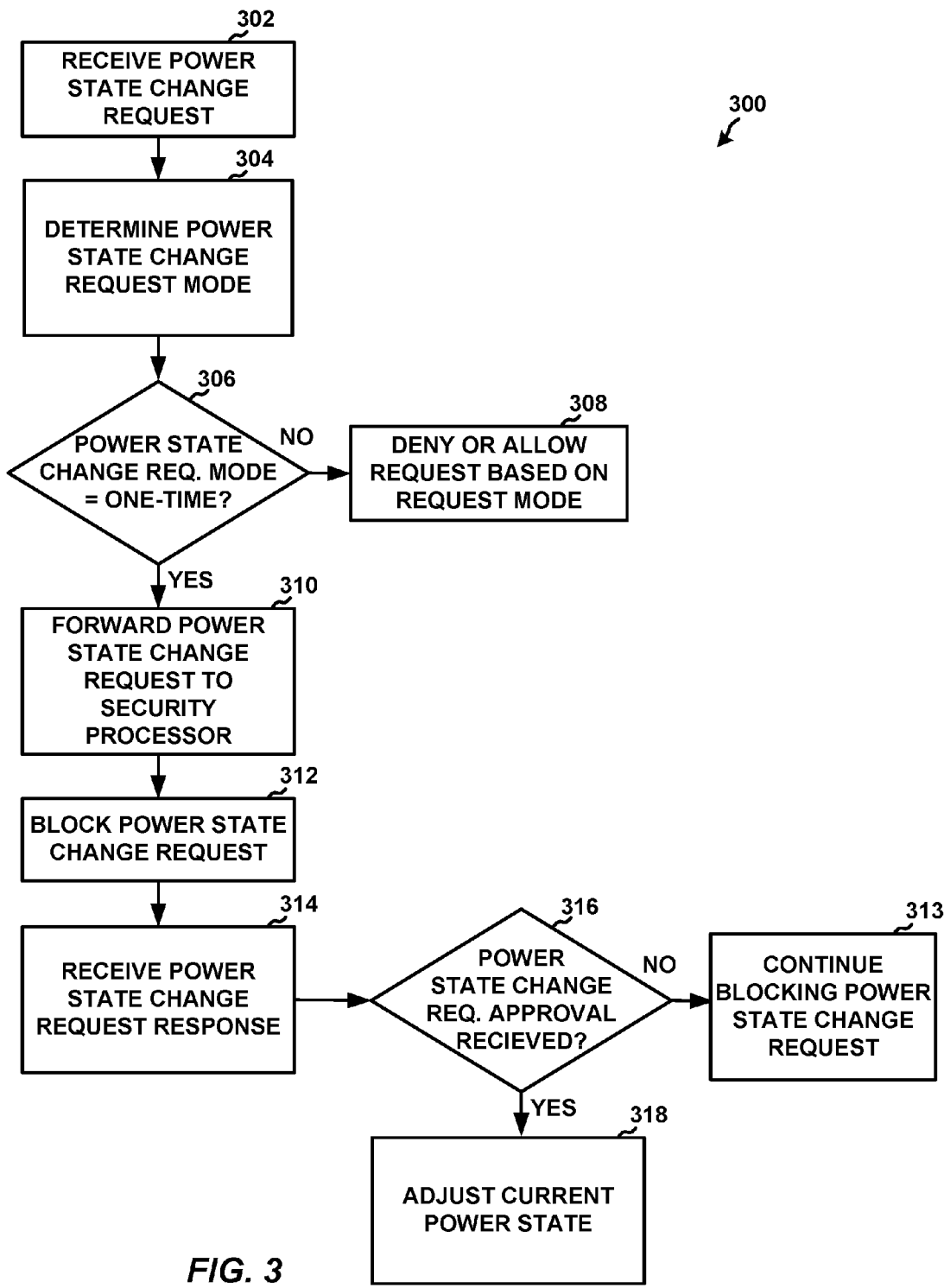
FIG. 3 is a flow chart of an exemplary method of operation of the secure power state module of FIG. 2 for securing a power state change, according to some embodiments.

FIG. 3 illustrates an exemplary flow diagram 300 of an exemplary detailed method of operation of processor 150 of FIG. 1 for securing control over a power state change according to one or more power state change request modes. The various steps of methodology 300 may be performed by one or more components illustrated in FIG. 1. At block 302, methodology 300 may include receiving a power state change request, which may be generated by an operating system and may be associated with one or more processors or processing cores. Furthermore, at block 304, methodology 304 may include determining a power state change request mode associated with the one or more processors or processing cores of the request received at block 302.

At block 306, methodology 300 may include determining whether a power state change request mode associated with the processor or core(s) of the power state change request is a one-time request mode. Where it is determined that the power state change request mode is not the one-time request mode, the request may be denied or allowed at block 308 based on the power state change request mode that is not a one-time request mode. For example, where the power state change request mode is a good-until-cancel mode and a cancel signal has not been received, the request may be approved and executed. Alternatively, where the power state change request mode is a disable mode 210, the power state change request may be approved and executed, for example, without forwarding the request to the security processor.

Where, however, the power state change request mode is determined to be a one-time request mode at block 306, the power state change request may be forwarded to the security processor at block 310 and may be blocked (e.g. temporarily) at block 312. Though blocks 310 and 312 are illustrated as being sequential, these blocks may be executed contemporaneously or block 312 may be executed before block 310 in some embodiments. Additionally, at block 314, a power state change request response may be received, for example, from the security processor. At block 316, methodology 300 may further include determining whether the security processor approved the power state change request by determining whether an approval has been received in response to the power state change request. Where it is determined that an approval in the form of a power state change request response has not been received after a predetermined amount of time, a power control module may continue to block 313 the power state change associated with the power state change request. In other words, there may not be an explicit denial response received from the security processor for any power state change request. Instead, in these examples, if approval is not granted, then the security processor simply may not respond and the power state change remains blocked until an exit from the C-state. Alternatively, where it is determined that the approving power state change request response has been received at block 316, the temporary blockage of the power state change request may be lifted and the current power state may be altered 318 such that the processor and/or core(s) operate in a target power state included in the power state change request.

The disclosed operations set forth herein may be carried out by one or more suitable processors that are in communication with non-transitory computer readable medium such as but not limited to CDROM, RAM, DRAM, other forms of ROM, hard drives, distributed memory, etc. The non-transitory computer readable medium stores executable instructions that when executed by the one or more processors cause the one or more processors to perform, for example, the operations of secure power state module 122 described herein and/or the methods as described with reference to FIG. 3.

Figure 4:
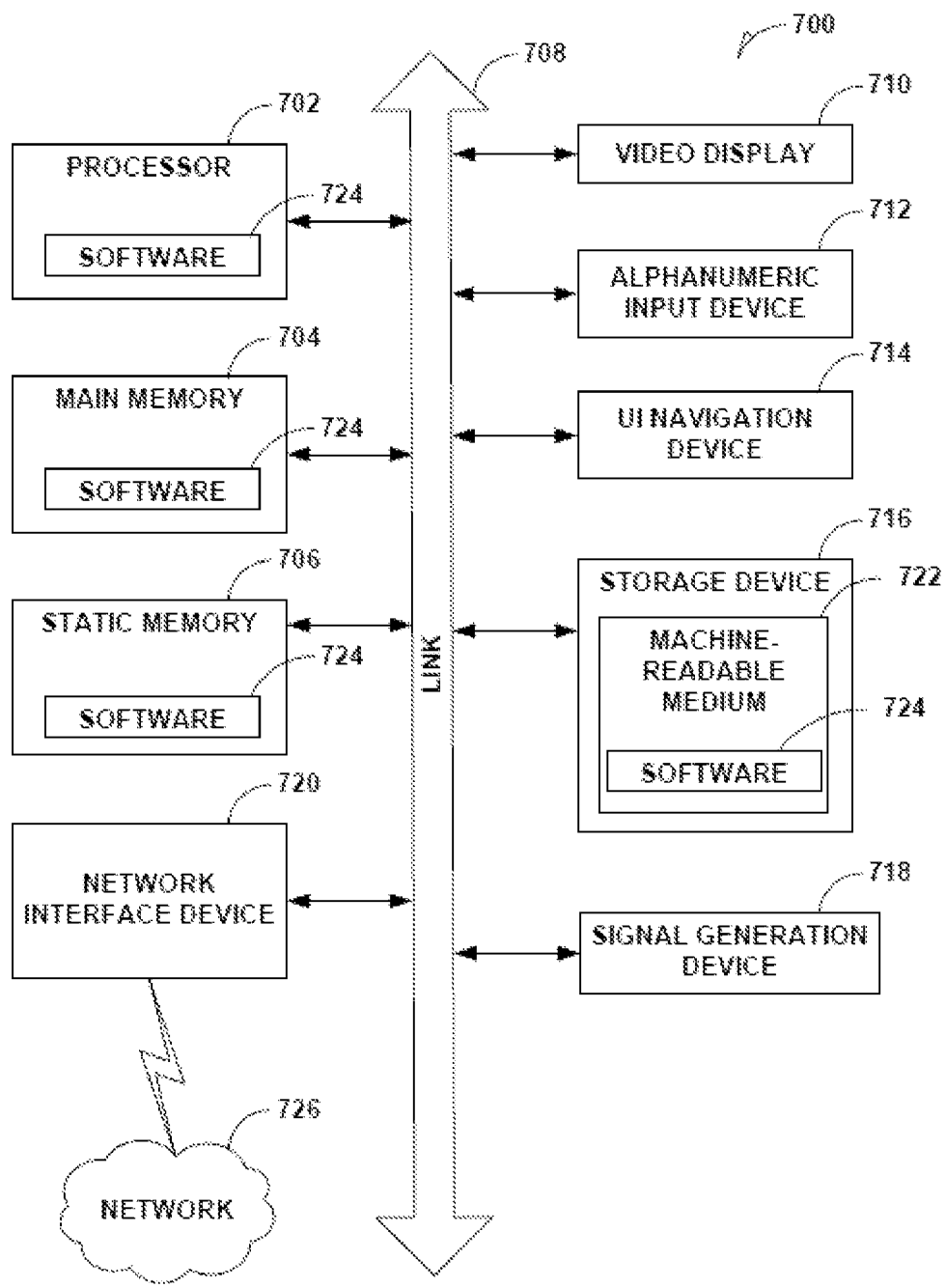
FIG. 4 is a block diagram illustrating a machine in the example form of a computer system, which may represent one or more of the devices introduced above, including, but not limited to, one or more memory structures, devices, systems, or the like described herein.

FIG. 4 is a block diagram illustrating a machine in the example form of a computer system 700, which may represent one or more of the devices introduced above, including, but not limited to, one or more memory structures, devices, systems, or the like described herein. Within the example computer system 700 are a set or sequence of instructions for causing the machine to perform any one of the methodologies discussed herein may be executed, according to an example embodiment. In alternative embodiments, the machine operates as a standalone device or may be connected (e.g. networked) to other machines. In a networked deployment, the machine may operate in the capacity of either a server or a client machine in server-client network environments, or it may act as a peer machine in peer-to-peer (or distributed) network environments. The machine may be a video game console, personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 700 includes at least one processor 702 (e.g. a central processing unit (CPU), a graphics processing unit (GPU) or both, processor cores, computer nodes, etc.), a main memory 704 and a static memory 706, which communicate with each other via a link 708 (e.g. bus). The computer system 700 may further include a video display unit 710, an alphanumeric input device 712 (e.g. a keyboard), and a user interface (UI) navigation device 714 (e.g. a mouse). In one embodiment, the video display unit 710, input device 712 and UI navigation device 714 are incorporated into a touch screen display. The computer system 700 may additionally include a storage device 716 (e.g. a drive unit), a signal generation device 718 (e.g. a speaker), a network interface device 720, and one or more sensors (not shown), such as a global positioning system (GPS) sensor, compass, accelerometer, or other sensor.

The storage device 716 includes a machine-readable medium 722 on which is stored one or more sets of data structures and instructions 724 (e.g. software) embodying or utilized by any one or more of the methodologies or functions described herein. In an aspect, any of the memory structures, devices, architectures, or the like described in this disclosure may be embodied in storage device 716. The instructions 724 may also reside, completely or at least partially, within the main memory 704, static memory 706, and/or within the processor 702 during execution thereof by the computer system 700, with the main memory 704, static memory 706, and the processor 702 also constituting machine-readable media.

While the machine-readable medium 722 is illustrated in an example embodiment to be a single medium, the term "machine-readable medium" may include a single medium or multiple media (e.g. a centralized or distributed database, and/or associated caches and servers) that store the one or more instructions 724. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or corresponding to such instructions. The term "machine-readable medium" shall accordingly be taken to include, but not be limited to, solid-state memories, and optical and magnetic media. Specific examples of machine-readable media include non-volatile memory, including, by way of example, semiconductor memory devices (e.g. Electrically Programmable Read-Only Memory (EPROM), Electrically Erasable Programmable Read-Only Memory (EEPROM)) and flash memory devices; magnetic disks such as internal hard disks and removable disks; magneto-optical disks; and CD-ROM and DVD-ROM disks.

The instructions 724 may further be transmitted or received over a communications network 726 using a transmission medium via the network interface device 720 utilizing any one of a number of well-known transfer protocols (e.g. HTTP). Examples of communication networks include a local area network (LAN), a wide area network (WAN), the Internet, mobile telephone networks, Plain Old Telephone (POTS) networks, and wireless data networks (e.g. Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Also, integrated circuit fabrication systems (e.g., wafer fabrication system) are known that create wafers with integrated circuits based on executable instructions stored on a computer readable medium such as but not limited to CDROM, RAM, other forms of ROM, hard drives, distributed memory, etc. are produced by an integrated circuit design system (e.g., work station). The instructions may be represented by any suitable language such as but not limited to hardware descriptor language (HDL), Verilog or other suitable language. As such, the logic and circuits described herein may also be produced as integrated circuits by such fabrication systems using the non-transitory computer readable medium with instructions stored therein. For example, an integrated circuit with the aforedescribed logic and structure may be created using such integrated circuit fabrication systems. The computer readable medium stores instructions executable by one or more integrated circuit design systems that causes the one or more integrated circuit design systems to fabricate an integrated circuit. The designed integrated circuit includes a secure power state module for adjusting a power state of a processor, comprising a power state change request receiving module configured to receive a power state change request from the processor, wherein the power state change request comprises a request to change a current power state of the processor to a target power state, the processor having a plurality of potential power states each including an operating power profile; a power state change request mode module configured to determine a power state change request mode associated with the processor; a request forwarding module configured to forward the power state change request to a security processor where the power state change request mode is a one-time request mode; a response receiving component configured to receive a power state change request response from the security processor in response to the request; and a power state change execution module configured to adjust the current power state of the processor to the target power state where the power state change request response comprises a power state change approval. The fabricated integrated circuit may also include the other aspects described herein.

While the embodiments have been described as having preferred designs, the disclosed embodiments can be further modified within the spirit and scope of this disclosure. This application is therefore intended to cover any variations, uses, or adaptations of the embodiments using its general principles. Further, this application is intended to cover such departures from the present disclosure as come within known or customary practice in the art to which this disclosure pertains and which fall within the limits of the appended claims.

What is claimed is:

1. A method of securing a power state change of a processor, the method comprising:
   receiving, by a power control module, a power state change request from the processor, wherein the power state change request comprises a request to change a current power state of the processor to a target power state, the processor having a plurality of potential power states each including an operating power profile;
   determining, by the power control module, a power state change request mode of a plurality of power state change request modes associated with the processor;
   forwarding, by the power control module, the power state change request to a security processor where the power state change request mode is a one-time request mode wherein the power control module blocks the power state change request while the security processor authenticates the power state change request;
   receiving, by the power control module, a power state change request response from the security processor in response to the authentication of the power state change request by the security processor; and
   adjusting, by the power control module, the current power state of the processor to the target power state where the power state change request response comprises a power state change approval.

2. The method of claim 1, wherein the blocking, by the power control module, of the request for the power state change is during a request evaluation interval, during which the security processor evaluates the request.

3. The method of claim 2, further comprising reversing the blocking where the power state change request response comprises the power state change approval.

4. The method of claim 1, further comprising adjusting, by the power control module, the current power state of the processor to the target power state where the power state change request mode is an always approve mode.

5. The method of claim 1, further comprising maintaining the current power state where the power state change request mode is an always deny mode.

6. The method of claim 1, further comprising flushing one or more caches associated with the processor based upon the power state change approval.

7. The method of claim 1, forwarding each received power state change request to the security processor while the power state change request mode remains in the one-time request mode.

8. The method of claim 1, further comprising:
   receiving a power state change request mode altering command associated with the processor; and
   altering the power state change request mode based on the power state change request mode altering command.

9. The method of claim 1, wherein the processor comprises a core of one or more cores associated with a central processing unit.

10. The method of claim 1, wherein at least one of the current power state and the target power state comprise a C-state.

11. An apparatus for securing a power state change of a processor, comprising:
   a power state change request receiving module configured to receive a power state change request from the processor, wherein the power state change request comprises a request to change a current power state of the processor to a target power state, the processor having a plurality of potential power states each including an operating power profile;
   a power state change request mode module configured to determine a power state change request mode of a plurality of power state change request modes associated with the processor;
   a request forwarding module configured to forward the power state change request to a security processor where the power state change request mode is a one-time request mode;

a request blocking module configured to block the power state change request while the security processor authenticates the power state change request;

a response receiving component configured to receive a power state change request response from the security processor in response to the authentication of the power state change request by the security processor; and a power state change execution module configured to adjust the current power state of the processor to the target power state where the power state change request response comprises a power state change approval.

12. The apparatus of claim 11, wherein the request blocking module is configured to block the request for the power state change during a request evaluation interval, during which the security processor evaluates the request.

13. The apparatus of claim 12, wherein the request blocking module is further configured to reverse the blocking where the power state change request response comprises the power state change approval.

14. The apparatus of claim 11, wherein the power state change execution module is further configured to adjust the current power state of the processor to the target power state where the power state change request mode is an always approve mode.

15. The apparatus of claim 11, wherein the power state change execution module is further configured to maintain the current power state where the power state change request mode is an always deny mode.

16. The apparatus of claim 11, wherein the power state change execution module is further configured to flush one or more caches associated with the processor based upon the power state change approval.

17. The apparatus of claim 11, wherein the request forwarding module is further configured to forward each received power state change request to the security processor while the power state change request mode remains in the one-time request mode.

18. The apparatus of claim 11, wherein:
the power state change request receiving module is further configured to receive a power state change request mode altering command associated with the processor; and
the power state change execution module is further configured to alter the power state change request mode based on the power state change request mode altering command.

19. The apparatus of claim 11, wherein the processor comprises a core of one or more cores associated with a central processing unit.

20. The apparatus of claim 11, wherein at least one of the current power state and the target power state comprise a C-state.

21. A non-transitory storage medium that comprises executable instructions thereon that when executed by an integrated circuit fabrication system, causes the system to form an integrated circuit that comprises a secure power state module for adjusting a power state of a processor, comprising:
a power state change request receiving module configured to receive a power state change request from the processor, wherein the power state change request comprises a request to change a current power state of the processor to a target power state, the processor having a plurality of potential power states each including an operating power profile;

a power state change request mode module configured to determine a power state change request mode of a plurality of power state change request modes associated with the processor;

a request forwarding module configured to forward the power state change request to a security processor where the power state change request mode is a one-time request mode;

a request blocking module configured to block the power state change request while the security processor authenticates the power state change request;

a response receiving component configured to receive a power state change request response from the security processor in response to the authentication of the power state change request by the security processor; and a power state change execution module configured to adjust the current power state of the processor to the target power state where the power state change request response comprises a power state change approval.

22. The non-transitory storage medium of claim 21, wherein the request blocking module is configured to block the request for the power state change during a request evaluation interval, during which the security processor evaluates the request.

23. The non-transitory storage medium of claim 22, wherein the request blocking module is further configured to reverse the blocking where the power state change request response comprises the power state change approval.

24. The non-transitory storage medium of claim 21, wherein the power state change execution module is further configured to adjust the current power state of the processor to the target power state where the power state change request mode is an always approve mode.

25. The non-transitory storage medium of claim 21, wherein the power state change execution module is further configured to maintain the current power state where the power state change request mode is an always deny mode.

26. The non-transitory storage medium of claim 21, wherein the power state change execution module is further configured to flush one or more caches associated with the processor based upon the power state change approval.

27. The non-transitory storage medium of claim 21, wherein the request forwarding module is further configured to forward each received power state change request to the security processor while the power state change request mode remains in the one-time request mode.

28. The non-transitory storage medium of claim 21, wherein:
the power state change request receiving module is further configured to receive a power state change request mode altering command associated with the processor; and
the power state change execution module is further configured to alter the power state change request mode based on the power state change request mode altering command.

29. The non-transitory storage medium of claim 21, wherein the processor comprises a core of one or more cores associated with a central processing unit.

30. The non-transitory storage medium of claim 21, wherein at least one of the current power state and the target power state comprise a C-state.

* * * * *